United States Patent

[11] 3,621,132

[72] Inventor Charles E. Page
Westbury, N.Y.
[21] Appl. No. 887,850
[22] Filed Dec. 24, 1969
[45] Patented Nov. 16, 1971
[73] Assignee Hazeltine Corporation

[54] FLARE LIGHT COMPENSATOR IN A FLYING SPOT SCANNER
10 Claims, 6 Drawing Figs.

[52] U.S. Cl. .... 178/72 R, 178/7.2 D, 178/7.7, 250/217 CR, 313/64, 315/22
[51] Int. Cl. .... H04n 3/16
[50] Field of Search .... 178/7.2 B, 7.2 D, 7.2, 7.7; 250/217 CR; 315/22

[56] References Cited

UNITED STATES PATENTS

| | | | |
|---|---|---|---|
| 2,289,978 | 7/1942 | Malter | 313/92 |
| 2,734,142 | 2/1956 | Barnes | 313/92 |

*Primary Examiner*—Robert L. Griffin
*Assistant Examiner*—Donald E. Stout
*Attorney*—Edward A. Onders

ABSTRACT: Disclosed is apparatus for compensating for the effects of flare light in an electrooptical image scanning system wherein a flying spot scanner generates a light raster and a light detector generates a video signal representative of an image illuminated by the raster. The faceplate of the flying spot scanner has been made substantially thicker than conventional faceplates in order to cause the flying spot scanner to emit a flare light which is uniform across the raster area. A portion of the amplitude of the video signal generated is representative of the uniform flare light in the scanning system and is proportional to the average brightness of the scanned image. In order to compensate for that portion, the apparatus utilizes an averaging circuit, a keyed clamping circuit, and an amplitude adjusting circuit, to develop a pedestal signal which has an opposite polarity to the polarity of the video signal and an amplitude approximately equal to the portion of the amplitude of the video signal caused by uniform flare light. The pedestal signal and the video signal are then combined by a summing circuit in order to cause their amplitudes to be effectively subtracted thereby producing a compensated output video signal which is substantially free from the effects of flare light.

FLARE LIGHT COMPENSATOR IN A FLYING SPOT SCANNER

BACKGROUND OF THE INVENTION

This invention relates to apparatus for compensating for the effects of flare light in an electro-optical image scanning system in which a flying spot scanner generates a light raster and a light detector generates a video signal representative of the image illuminated by the raster.

Flare light in the optical path of the flying spot scanner causes the video signal generated by the light detector to have a contrast ratio significantly reduced from the optical contrast ratio of the original image. This in turn will cause images generated from the video signal (i.e., photographic prints, previewed images, etc.) to have distinct and undesirable differences from the original image.

A major source of flare light in such a system is the flying spot scanner face plate which generally consists of a thin transparent portion of glass coated on its interior surface with at least one electron-sensitive phosphor. When a raster-producing electron beam excites any spot on the phosphor, it behaves as a point source of light which emits rays according to Lambert's Law. Light rays which strike the glass/air boundary at the exterior surface of the face plate at an angle greater than the critical angle for internal reflection of light are reflected back toward the interior surface of the glass where they illuminate additional spots on the phosphor coating. The additional spots illuminated by this first bounce of reflection act as additional Lambert's Law sources having an intensity less than that of the original spot. The result is a halo of light surrounding the original spot and approximately exponentially decreasing in intensity as the distance from the original spot increases. Since each spot in the raster behaves in a like manner, the cumulative effect is a flare light which is nonuniform across the raster area. This nonuniform flare light, when combined with the uniform flare light caused by reflections from other surfaces in the optical path of the scanning system, produces a complex nonuniform pattern of flare light across the raster area which cannot be easily compensated for by presently known techniques.

It is therefore an object of the invention to provide apparatus for compensating for the effects of flare light in an electro-optical image scanning system.

In accordance with the invention in an electro-optical image scanning system wherein a flying spot scanner generates a light raster having predetermined dimensions and wherein a light detector generates a video signal representative of the image illuminated by the raster, an apparatus for compensating for the effects of flare light in the scanning system includes a flying spot scanner having a face plate with a thickness at least as great as H/4 Tan $\theta$ where $H$ is the shortest dimension of the raster and $\theta$ is the critical angle for internal reflection of light for the face plate material. This causes the flying spot scanner to emit a substantially uniform flare light from the raster. Further included are means, responsive to the video signal, for developing a pedestal signal having an amplitude representative of the uniform flare in the scanning system. Finally includes are means for combining the pedestal signal with the video signal to compensate for the portion of the video signal caused by the uniform flare light in the scanning system, thereby providing a compensated output video signal.

For a better understanding of the present invention, together with other and further objects thereof, reference is had to the following description taken in connection with the accompanying drawings and its scope will be pointed out in the appended claims.

DESCRIPTION OF THE EMBODIMENT OF FIG. 1

Figure 1:
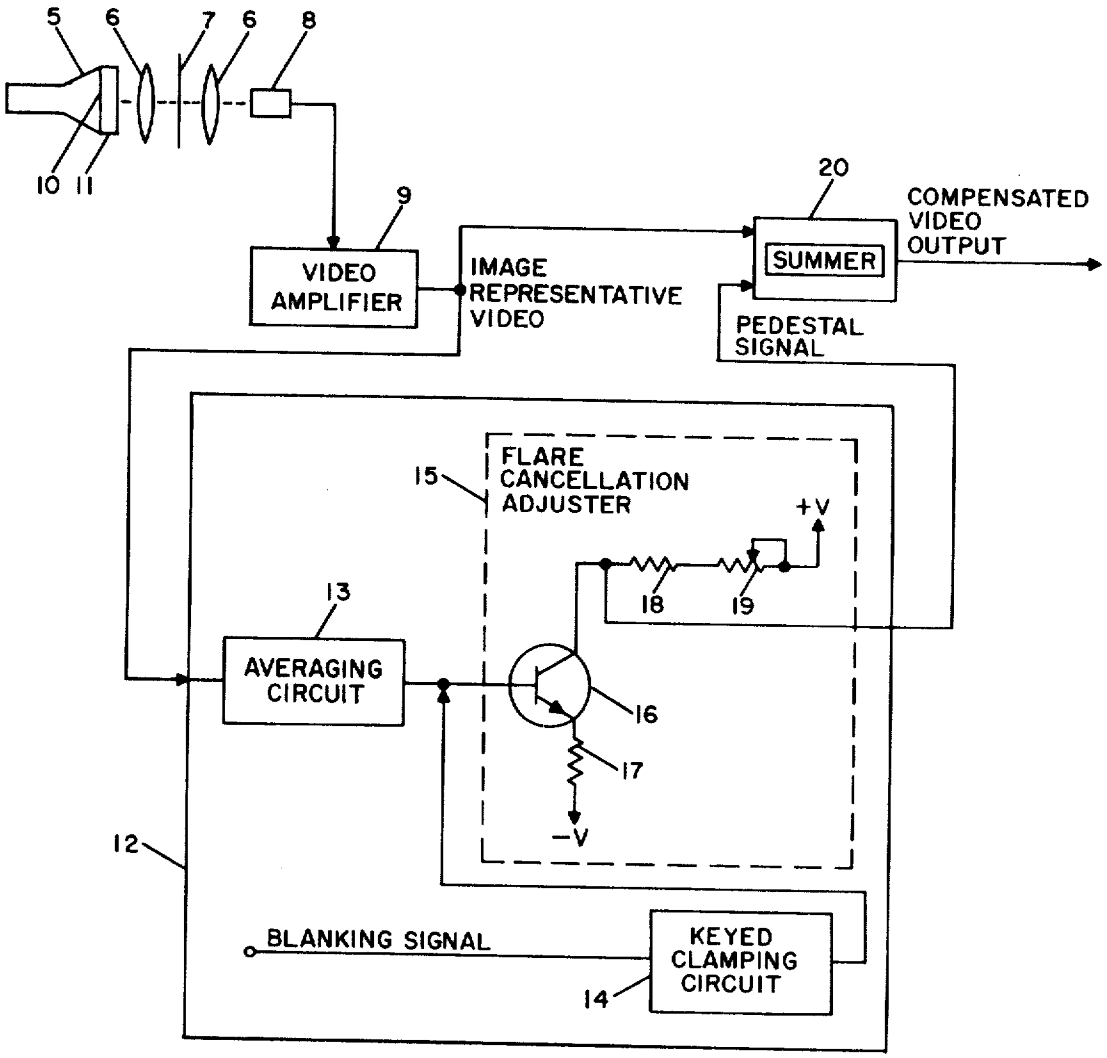
FIG. 1 is a block and schematic illustration of an embodiment of the invention useful in an electro-optical image scanning system.

In the embodiment of FIG. 1, flying spot scanner 5, lenses 6, image 7 (i.e., a photographic transparency), a light detector 8 (i.e., a photomultiplier), and video amplifier 9 cooperate with other electrical and optical elements, not illustrated, but well known in the art, to form an electro-optical image scanning system. Operationally, the flying spot scanner generates a light raster by utilizing a controlled electron beam to excite a phosphor coating on the interior surface 10 of face plate 11 in a predetermined pattern of lines separated by blanking intervals. An image scan period is defined as the time in which the raster completely illuminates an image. The raster pattern is usually a common configuration such as a rectangle or circle and therefore has normal dimensions, for example, the rectangular raster has a height and width. The particular raster pattern employed may be selected for the convenience of the user in accordance with the size and shape of the image to be illuminated.

Light which has been modulated by the image is recovered by light detector 8 which in turn generates a conventional video signal representative of the image 7 which is then supplied to combining means 20, and to pedestal signal developing means 12, through video amplifier 9. The video signal generated during each image scan period has (at the point scanned) a portion which is not truly representative of the image, but is the result of the flare light caused by reflections in different elements of the scanning system. The nonuniform flare light which normally emanates from the flying spot scanner faceplate is caused to be uniform by thickening faceplate 11 in a manner set forth hereinafter. The resultant uniform flare light when combined with additional uniform flare light form other optical elements in the system would normally cause the portion of the video signal due to flare light to be a fixed level, however, the varying densities of the scanned image cause this portion to be proportional to the average brightness of the original image, a quality which is represented by the average amplitude of the video signal.

Block 12 illustrates means, responsive to the video signal, for developing a pedestal signal having an amplitude representative of the uniform flare light in the scanning system. In order to develop the desired pedestal signal, the embodiment of FIG. 1 incorporates within block 12 an averaging circuit 13 which accepts the video signal from video amplifier 9, a keyed clamping circuit 14 connected to the output of the averaging circuit and a flare cancellation adjuster 15 connected to the outputs of both averaging circuit 13 and clamping circuit 14. The averaging circuit 13 accepts the varying amplitude video signal and produces a signal proportional to the average amplitude of the video signal over a selected time interval such as one image scan period and therefore proportional to the average brightness of the original image 7. Any conventional averaging circuit, such as an RC transistor integrator, can be employed as long as it is sensitive to the amplitude fluctuations of the video signal. Keyed clamping circuit 14 is responsive to a blanking signal occurring during each blanking interval of the raster, and clamps the signal from averaging circuit 13 to a fixed reference level which may be the same level as the blanking component of the video signal. This produces an intermediate pedestal signal which is the amplitude to the flare cancellation adjuster 15. The intermediate pedestal signal's polarity is generated to be opposite that of the video signal when combining means 20 is a summer. Its amplitude is determined by flare cancellation adjuster 15, thus producing a pedestal signal which is supplied to combining means 20 that is approximately equal to the portion of the video signal representative of uniform flare light.

In the embodiment of FIG. 1, flare cancellation adjuster 15 is shown as a transistor amplifier comprising transistor 16, connected to a negative power supply through biasing resistor 17 and to a positive power supply through resistor 18 and variable resistor 19 which is utilized to adjust the amplitude of the pedestal signal. A lead connected to the collector of the transistor supplies combining means 20 with the resultant pedestal signal.

Block 20 illustrates means for combining the pedestal signal with the video signal to compensate for the portion of the video signal caused by uniform flare light in the scanning system. Although represented as a summer, it will be recognized by those skilled in the art that if it was desired to produce the pedestal signal and the video signal having the same polarity, a subtraction circuit could be employed as block 20. In either case, the same compensated video signal output is produced. When the video signal is combined with the pedestal signal, which has an amplitude approximately equal to the portion of the video signal due to flare light, the amplitude of the pedestal signal is effectively subtracted from the amplitude of the video signal, due to their opposite polarities. The blanking intervals of both the video and pedestal signals being clamped to the same reference level remain unaffected. This compensates for the flare light in the system providing an output compensated video signal which is substantially free from the effects of flare light.

DESCRIPTIONS OF FIGS. 2, 3 AND 4

Figures 4A, 4B:
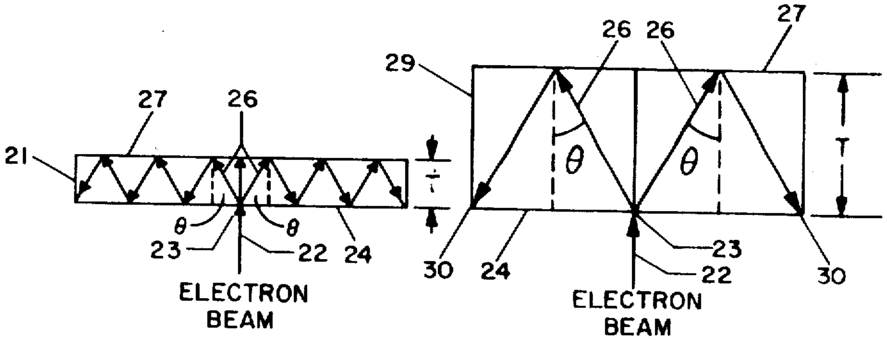
FIG. 4*a* is an exploded diagram of a section of a conventional flying spot-scanner faceplate illustrating the reflection of light rays between the interior and exterior surfaces of the faceplate.
FIG. 4*b* is an exploded diagram of a section of a flying spot-scanner faceplate useful in the embodiment of FIG. 1 showing the reflection of light rays between its interior and exterior surface.

In FIG. 1, the faceplate 11 is of the flying spot scanner 5 has made substantially thicker than conventional faceplates in order to cause the flying spot scanner to emit a substantially uniform flare light over the raster area. FIG. 4*a* shows a cross section of a conventional faceplate 21 in which an electron beam 22 excites a phosphor dot 23 on the coated interior surface of the faceplate 24 causing light rays to be emitted win all directions according to Lambert's Law. Rays 26 which strike the glass/air boundary at the exterior surface of the faceplate 27 at an angle greater than the critical angle $\theta$ for internal reflection of light (an angle which is measured between the normal to the surface and the incident beam and is dependent upon the faceplate material and the surrounding medium as is well known in the art) is reflected back towards the interior surface where it illuminates additional phosphors and causes the nonuniform flare light to be emitted as is herein before described.

In order to cause a flying spot scanner to emit the required uniform flare light, it has been found that thickening the faceplate to a value which is substantial with respect to the size of the raster will cause the additional undesirable reflections to occur outside of the raster area of the faceplate. FIG. 4*b* illustrates a faceplate 28 similar to the faceplate of FIG. 4*a* in shape and material, however, it is thickened in accordance with the invention. Arrows 26 represent light rays striking the exterior surface 27 of the faceplate at an angle greater than the critical angle for the material. It is seen that a faceplate having the thickness illustrated T causes the first bounce reflection to occur at the edge of the faceplate section 30 when the electron beam strikes the coated interior surface 24 of the faceplate at its center. By causing light due to reflections which occur after the first bounce to occur outside of the raster area of the faceplate, the resultant flare light loses its exponential decaying quality and becomes substantially uniform across the raster area as is required.

A minimum thickness for adequate compensation has been determined by theoretical calculations and empirical measurements. Basically the requirement is that light from a phosphor dot excited by an electron beam striking the center of the raster has its first bounce reflection occurring, outside of the raster area in the direction of the shortest dimension of the raster. Faceplates any thinner than this value allow too many reflections thereby causing (as shown in FIG. 4*a*) the undesirable nonuniform type of flare light to occur within the raster area. Mathematically, this relation is expressed as $$T \geq \frac{H}{4 \operatorname{Tan} \theta}$$

where $T$ represents thickness of the faceplate, $H$ represents the shortest dimension of the raster and $\theta$ represents the critical angle of the faceplate material. As stated, this equation represents a minimum requirement for adequate compensation. Depending upon the uniformity of the flare light and the accuracy of compensation required, a thickness in excess of that determined by the above equation can be employed. In certain situations this thickness can be greater than the largest dimension of the raster.

Figures 2A, 2B:
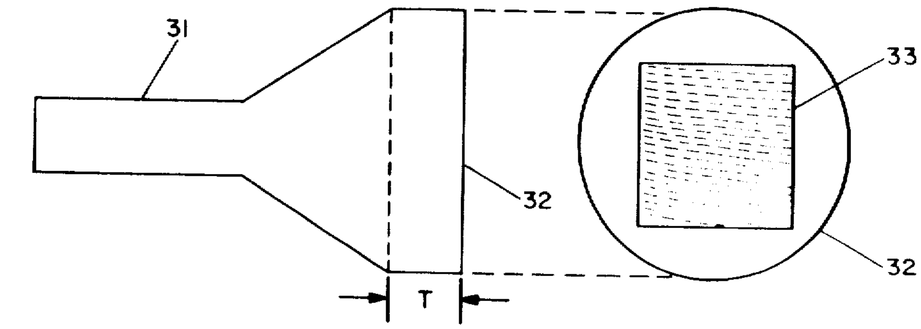
FIGS. 2*a* and 2*b* are spot scanner of a flying spot scanner showing front and side views useful in the embodiment of FIG. 1.

FIG. 2*a* shows a flying spot scanner 31 constructed in accordance with the invention. The faceplate 32 is formed in a normal manner from a continuous body of glass, however, it is provided with a thickness T which is great enough to satisfy the above equation with respect to the generated raster 33 illustrated in FIG. 2*b* which is a front view of faceplate 32.

Figure 3:
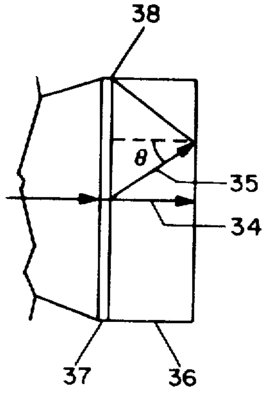
FIG. 3 is an exploded diagram of another flying spot-scanner also useful in the embodiment of FIG. 1.

FIG. 3 illustrates a second flying spot scanner constructed in accordance with the invention, light rays 34, 35 are additionally included to illustrate that reflections in excess of the first bounce occur outside of the raster area. The faceplate of FIG. 3 is formed by bonding a transparent plastic portion 36 to the exterior surface of a conventional flying spot scanner having a thin glass faceplate 37. In this manner, the thickness of the faceplate can be increased to a value in accordance with the above equation without materially affecting the construction of the faceplate.

Care must be taken to utilize a type of plastic and bonding material which will not cause substantial reflection at the glass/plastic boundary 38. In constructing a faceplate having the necessary characteristics a 1¼ inch thick portion of "Rohm & Haas Transparent Plexiglas" has been bonded with an optical cement to the faceplate of a Thomas 10M 28–M flying spot scanner tube on which a 4 by 5 inch rectangular raster is generated. It has been found that this arrangement causes the flying spot scanner to emit a substantially uniform flare light which is accurately compensated for by the disclosed system.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. In an electro-optical image scanning system wherein a flying spot scanner generates a light raster having predetermined dimensions and wherein a light detector generates a video signal representative of the image illuminated by said raster, an apparatus for compensating for the effects of flare light in said scanning system, comprising:

a flying spot scanner having a faceplate which a thickness at least as great as
$H/4 \operatorname{Tan} \theta$ where
$H$ is the shortest dimension of said
raster and
$\theta$ is the critical angle for internal reflection
of light for the faceplate material, thereby causing said flying spot scanner to emit a substantially uniform flare light from said raster;

means, responsive to said video signal, for developing a pedestal signal having an amplitude representative of the uniform flare light in said scanning system;

and means for combining said pedestal signal with said video signal to compensate for the portion of said video signal caused by the uniform flare light in said scanning system, thereby providing a compensated output video signal.

2. Apparatus in accordance with claim 1 wherein said pedestal signal developing means comprises means for averaging said video signal over an image scan period to develop a signal having an amplitude proportional to the average amplitude of said video signal;

and means for establishing said average amplitude signal at a fixed reference level during each blanking interval of said raster to provide said pedestal signal.

3. Apparatus in accordance with claim 2 wherein said averaging means develops a signal having a polarity opposite to that of said video signal and wherein said combining means comprises means for adding said pedestal signal and said video signal.

4. Apparatus in accordance with claim 1 wherein said faceplate consists of a continuous body of transparent glass.

5. Apparatus in accordance with claim 1 wherein said faceplate consists of a glass portion having interior and exterior surfaces and a transparent plastic portion substantially thicker than said glass and arranged to be contiguous to the exterior surface of said glass portion.

6. In an electro-optical image scanning system wherein a flying spot scanner generates a light raster having predetermined dimensions and wherein a light detector generates a video signal representative of the image illuminated by said raster, an apparatus for compensating for the effects of flare light in said scanning system, comprising:

a flying spot scanner having a face plate with a thickness at least as great as

H/4 Tan $\theta$ where H is the shortest dimension of said raster and $\theta$ is the critical angle for internal reflection of light for the faceplate material, thereby causing said flying spot scanner to emit a substantially uniform flare light from said raster;

means for averaging said video signal over an image scan period to develop a signal having an amplitude proportional to the average amplitude of said video signal;

means for clamping said average amplitude signal to a fixed reference level during each blanking interval of said raster, to develop an intermediate pedestal signal;

means, for adjusting the amplitude of said intermediate pedestal signal to provide a pedestal signal with an amplitude proportional to the uniform flare light in said scanning system;

means for adjusting the amplitude of said intermediate pedestal signal to provide a pedestal signal with an amplitude proportional to the uniform flare light in said scanning system;

and means for combining said pedestal signal with said video signal to compensate for the portion of said image representative signal caused by uniform flare light in said scanning system thereby providing a compensated output video signal.

7. Apparatus in accordance with claim 6 wherein said averaging means develops a signal having an opposite polarity to that of said video signal and said combining means compresses means for adding said pedestal signal to said video signal.

8. Apparatus in accordance with claim 6 wherein said faceplate consists of a continuous body of transparent glass.

9. Apparatus in accordance with claim 6 wherein said faceplate consists of a glass portion having interior and exterior surfaces and a transparent plastic portion substantially thicker than said glass and arranged to be contiguous to the exterior surface of said glass portion.

10. Apparatus in accordance with claim 6 wherein said adjusting means comprises a transistor amplifier cooperating with a variable resistor to adjust the amplitude of said intermediate pedestal signal.

* * * * *